United States Patent
Calabro (10) Patent No.: US 8,590,951 B1
(45) Date of Patent: Nov. 26, 2013

(54) RETRACTABLE IMPACT PROTECTION SYSTEM FOR USE WITH A VEHICLE BODY

(76) Inventor: Michael Calabro, Rockaway Park, NY (US)

( * ) Notice: Subject to any disclaimer, the term of this patent is extended or adjusted under 35 U.S.C. 154(b) by 0 days.

(21) Appl. No.: 13/478,109

(22) Filed: May 23, 2012

Related U.S. Application Data (60) Provisional application No. 61/515,386, filed on Aug. 5, 2011.

(51) Int. Cl.
  *B60R 19/42* (2006.01)
(52) U.S. Cl.
  USPC .......................................... 293/127; 293/126
(58) Field of Classification Search
  USPC .......................................... 293/128, 127, 126
  See application file for complete search history.

(56) References Cited

U.S. PATENT DOCUMENTS

| | | | |
|---|---|---|---|
| 2,724,395 A | 11/1955 | Valentine et al. | |
| 3,563,594 A | 2/1971 | London | |
| 4,856,842 A | 8/1989 | Ross et al. | |
| 4,958,881 A | 9/1990 | Piros | |
| 5,022,700 A | 6/1991 | Fasiska et al. | |
| 5,184,857 A * | 2/1993 | Hawkins | 293/128 |
| 6,736,435 B1 * | 5/2004 | Ditthavong | 293/128 |
| 7,464,982 B1 | 12/2008 | Lin et al. | |
| 7,527,320 B1 * | 5/2009 | Nevell, Jr. | 293/102 |
| 2011/0221212 A1 * | 9/2011 | Sturdee | 293/127 |

* cited by examiner

*Primary Examiner* — Joseph Pape
*Assistant Examiner* — Dana Ivey
(74) *Attorney, Agent, or Firm* — RG Patent Consulting, LLC; Rachel Gilboy (57) ABSTRACT

A retractable impact protection system for use with a vehicle body having two cylindrical housings with telescopic extensions concentrically located at the ends of each housing that are able to secure the housings in a vertical position within the trunk of an automobile. A retractable protector-band is wound onto and off of a spool located inside the housing, and is rewound via a spring rewinder. The protector band is a resilient material and when in an extended position is able to protect the vehicle body from impact damage by creating a barrier. The left side retractable impact protection belt assembly and the right side retractable impact protection belt assembly extend from the trunk, down the sides of the automobile, and attach either to points on the vehicle front or attach to each other via hooks attached to the ends of the protector-bands.

20 Claims, 5 Drawing Sheets

RETRACTABLE IMPACT PROTECTION SYSTEM FOR USE WITH A VEHICLE BODY

CROSS-REFERENCE TO RELATED APPLICATION

The present applications are related to and claims priority from prior provisional application Ser. Nos. 61/515,386 filed Aug. 5, 2011 which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of car body protectors and more specifically relates to a retractable impact protection system for use with a vehicle body, entitled 'ding-saver/ding-guard'.

2. Description of the Related Art

To many people in modern society, the automobile is a status symbol of class. The more expensive the car, the greater the income or wealth is expected to be of the person who owns it. This is not always true because many people are just automobile buffs who enjoy spending a disproportionate percentage of their income on restoring old automobiles or retrofitting newer automobiles with add-ons and upgraded accessories. To many people, automobiles are a hobby, and as such, the expense and labor put into them seem much more justifiable. Besides a home, the automobile may be the biggest single purchase that a person makes. Automobiles can also be an investment. Older classic cars that have been completely restored command a sales price that usually far exceeds the original purchase price. Some car owners have large fortunes in the form of rare and classic restored cars that are relatively safe from the ups and downs of financial market fluctuations.

The thing that almost all rare, expensive, and classic restored (or un-restored) cars have in common is a flawless body and a beautiful paint job. It is desirable that the vehicle body remain free of dents with no scratches in the paint in order to retain its value such that it looks 'right' and is easily re-sellable. The owner can expect to drive the car for several years and then re-sell it for enough money to get at least a good portion of the original purchase price back.

The biggest detriment to maintaining the value of an automobile investment and realizing a good resale value is the degradation of the automobile body's appearance. A quality paint job can cost a substantial sum. It is unfortunate that the value of a paint job can be greatly diminished in seconds by people who have no money invested in your car, who carelessly open their car doors into the sides of your car leaving dents and scratches. Careless shoppers almost daily set shopping carts free to speed downhill into the sides of expensive cars and damage costly paint jobs. The most common repairs that automobile body shops make are from parking lot dings and scratches accumulated over time. A costly automobile paint job is a vulnerable investment. There is a need for a conveniently deployable protector to help protect the automobile owner's investments.

Various attempts have been made to solve the above-mentioned problems such as those found in U.S. Pat. Nos. 3,563,594; 4,958,881; 7,464,982; 2,724,395; 4,856,842; and 5,022,700. This prior art is representative of car body protectors. None of the above inventions and patents, taken either singly or in combination, is seen to describe the invention as claimed.

Ideally, a car body protector should provide adequate protection and convenience of use, and yet, would operate reliably and be manufactured at a modest expense. Thus, a need exists for a user-friendly, reliable retractable impact protection system for use with a vehicle body to provide protection for vehicle body exterior surfaces and to avoid the above-mentioned problems.

BRIEF SUMMARY OF THE INVENTION

In view of the foregoing disadvantages inherent in the known car body protector art, the present invention provides a novel retractable impact protection system for use with a vehicle body. The general purpose of the present invention, which will be described subsequently in greater detail, is to provide adequate vehicle body protection and convenience of use for deploying such a system.

Generally speaking, the retractable impact protection system is disclosed herein for use with a vehicle body and may preferably comprise two cylindrical housings with telescopic extensions concentrically located at the ends of each housing that are able to secure the housings in a vertical position within the trunk of an automobile when installed. A retractable protector-band is wound onto and off of a spool located inside the housing and is rewound via a spring rewinder (similar to how a seatbelt functions). The protector band preferably comprises a resilient, yet tough material and when in an extended position is able to protect the vehicle body from impact damage by creating a barrier. The left side retractable impact protection belt assembly and the right side retractable impact protection belt assembly may extend from the trunk in preferred embodiments, down the sides of the automobile, and attach either to points on the vehicle front or attach to each other via hooks attached to the ends of the protector-bands. They may be locked in place to increase security and deter tampering.

In greater detail, the retractable impact protection system may comprise at least one retractable impact protection belt assembly having a housing with an inner volume, a protector-band having a proximate end and a distal end, a spool having a spring re-winder and a locking pawl, at least one attacher having a first end with a protector-band-receiver and a second end with at least one lockable hook, and at least one securer having an attachment end and at least one jack(able) end.

The protector-band is able to be sequentially wound and unwound to and from the spool that is located within the inner volume of the housing. The spring re-winder and the locking pawl control relative movement of the protector-band in relation to the spool. The distal end of the protector-band is non-removably attached to the spool. The retractable impact protection system may comprise exactly two of the retractable impact protection belt assemblies, each having one of the protector-bands and one of the attachers such that each of the attachers are able to be coupled to each other at a front location of the vehicle body.

The protector-band is heavy gauge nylon or similar material and is at least about 12 inches wide and about 12 feet long. The protector-band may comprise a corrugated profile in some embodiments or may comprise a flat profile in other embodiments. The protector-band is flexible, yet can be pulled taunt and provides energy absorption means. The spool is able to rotate inside the housing, the housing comprising a substantially cylindrical shape. The housing preferably comprises ferrous metal but may be constructed of plastic or other materials. The housing comprises a lengthwise opening such that the protector-band is able to be wound onto and unwound off of the spool through the lengthwise opening. The proximate end of the protector-band is coupled to the attacher at the first end through the protector-band-receiver. The protector-band is able to be stored within the housing in a non-extended position during a non-use condition.

The attacher is attachable such that the protector-band is able to be secured in an extended position about and adjacent to the vehicle body. The securer secures the retractable impact protection belt assembly to a stationary fixed point on the vehicle body and the attachment end is non-removably affixed to the housing. The jack end(s) of the securer friction-contact inner volume upper and lower surfaces such as in an automobile trunk, and comprise at least one telescopic brace for removably affixing in a vertical position (threaded, hydraulic or other). The jack end(s) preferably further comprise feet on terminal ends of the telescopic brace(s). The telescopic braces may comprise at least one telescopic segment and are concentrically located at each terminal end. The plurality of telescopic segments twist-lock such that the telescopic segments are prevented from collapsing when in the extended condition. The feet comprise a threaded shaft such that the feet are able to be rotated counter-clockwise to extend and clockwise to retract the securer thereby being able to threadably extend and retract a length of the retractable impact protection belt assembly for securing between two surfaces.

The lockable hook(s) of the second end hold the protector-band in the extended position when hooked. The protector-band (when in the extended position) is able to protect the vehicle body from impact damage by creating a barrier. The attachers of the exactly two retractable impact protection belt assemblies may be locked to each other in the front of the vehicle body thereby preventing the door(s) of the vehicle from being opened, thereby also providing anti-theft protection.

A kit is described herein having at least one retractable impact protection belt assembly, at least one padlock with at least one key, and a set of user instructions.

A method of use for the retractable impact protection system for use with a vehicle body may comprise the steps of: inserting a retractable impact protection belt assembly into a vehicle trunk inner volume in a substantially vertical position, extending at least one securer, twist-locking (or otherwise locking) at least one securer into a fixed position, threadably adjusting (or otherwise adjusting) at least one foot of the securer(s) to wedge the retractable impact protection belt assembly between an upper surface and a lower surface of an inner volume of the truck trunk of a vehicle, extending the protector-band(s) of the retractable impact protection belt assembly and coupling the attacher(s) at a point on a front location of the vehicle (to each other or to a fixed point), using retractable impact protection belt assembly, uncoupling at least one attacher, and retracting the protector-band(s) such that the vehicle can be moved.

The present invention holds significant improvements and serves as a retractable impact protection system for use with a vehicle body. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, retractable impact protection system for use with a vehicle body, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a car body protector device and more particularly to a retractable impact protection system for use with a vehicle body as used to improve the convenience of protecting a vehicle body from dings, scratches and dents.

As mentioned, generally speaking a retractable impact protection system for use with a vehicle body may be preferably at least two cylindrical housings with telescopic extensions concentrically located at the ends of each housing that are able to secure the housings in a vertical position within the trunk of an automobile. A retractable protector-band is wound onto and off of a spool located inside the housing, and is rewound via a spring rewinder. The protector band comprises a resilient material and when in an extended position is able to protect the vehicle body from impact damage by creating a barrier. The left side retractable impact protection belt assembly and the right side retractable impact protection belt assembly extend from the trunk, down the sides of the automobile, and attach either to points on the vehicle front or attach to each other via hooks attached to the ends of the protector-bands.

Figure 1:
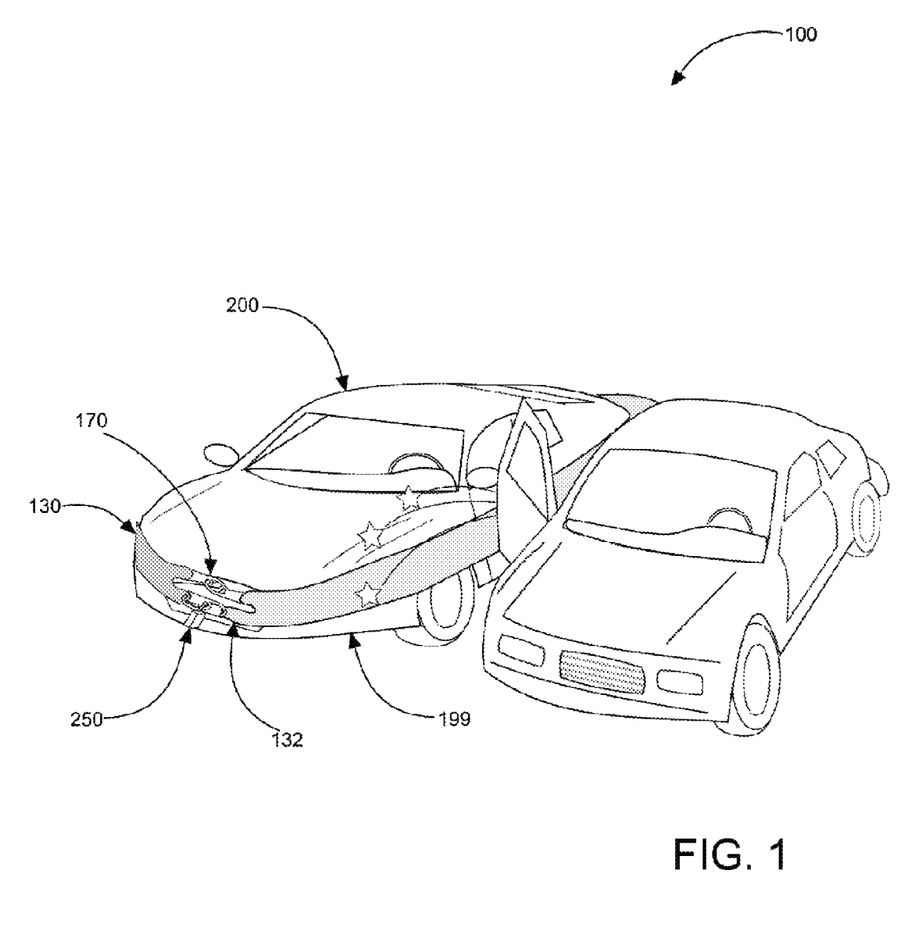
FIG. 1 shows a perspective view illustrating an in-use condition of a retractable impact protection system for use with a vehicle body according to an embodiment of the present invention.

Now, in greater detail, referring to the drawings by numerals of reference there is shown in FIG. 1, a perspective view illustrating an in-use condition of retractable impact protection system for use with a vehicle body 100 according to an embodiment of the present invention.

Retractable impact protection system for use with a vehicle body 100 may comprise at least one retractable impact protection belt assembly 110 having housing 120 with an inner volume, protector-band 130 (having proximate end 132 and distal end 134), spool 140 preferably having spring re-winder 150 and locking pawl 160, at least one attacher 170 having first end 172 with protector-band-receiver 174 and second end 176 with at least one lockable hook 178, and at least one securer 180 having attachment end 182 and at least one jack end 190. Alternate embodiments may comprise differently shaped securers 180 and attachers 170.

Figure 2:
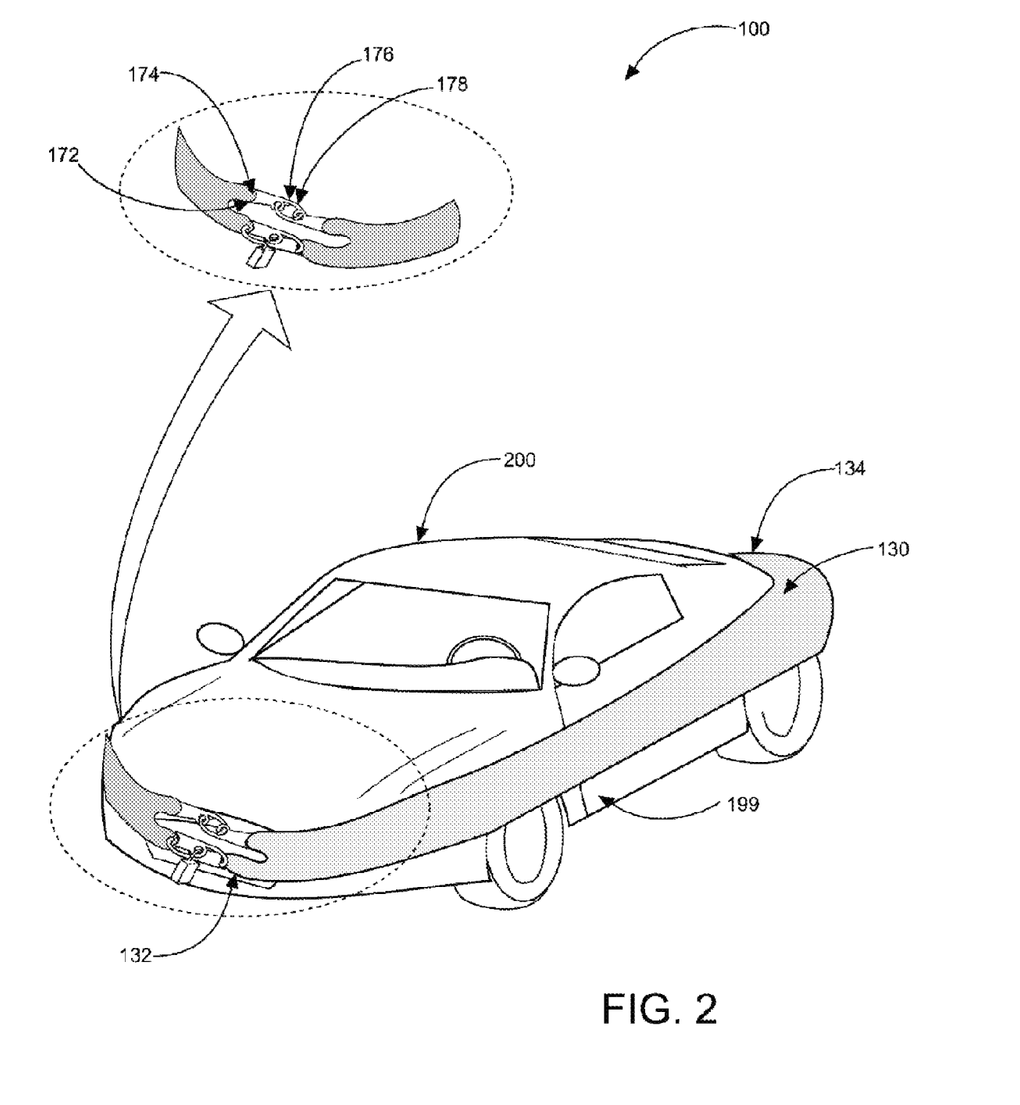
FIG. 2 is a perspective view illustrating an extended and locked position of the retractable impact protection system for use with a vehicle body according to an embodiment of the present invention of FIG. 1.

Referring now to FIG. 2, a perspective view illustrating an extended and locked position of retractable impact protection system for use with a vehicle body 100 according to an embodiment of the present invention of FIG. 1.

Retractable impact protection system for use with a vehicle body 100 may comprise exactly two retractable impact protection belt assembly(s) 110 each having one protector-band 130 and one attacher 170 such that each of attachers 170 are able to be coupled to each other in a front location of vehicle body 199. These versions operate as a left and right retractable impact protection belt assembly(s) 110. Lockable hook(s) 178 of second end 176 hold protector-band 130 in the extended position when hooked. Protector-band 130 when in the extended position is able to protect vehicle body 199 from impact damage by creating a barrier able to absorb impact forces.

Attacher(s) 170 of the exactly two retractable impact protection belt assembly(s) 110 may be locked to each other in the front of vehicle body 199 thereby preventing the door(s) of vehicle 200 from being opened, providing anti-theft protection. Protector-band 130 is preferably heavy gauge nylon or other similarly equivalent material and is at least about 12 inches wide and about 12 feet long (may be longer or shorter as per relative size/length of vehicle 200). Protector-band 130 may comprise a corrugated profile in some embodiments or may comprise a flat profile in other embodiments. Protector-band 130 is flexible, yet can be pulled taunt. Proximate end 132 of protector-band 130 is preferably coupled to attacher(s) 170 at first end 172 through protector-band-receiver 174. Attacher(s) 170 is attachable such that protector-band 130 is able to be secured in an extended position about and adjacent to vehicle body 199. Securer 180 secures retractable impact protection belt assembly(s) 110 to a stationary fixed point on vehicle body 199. Attachment end 182 is non-removably affixed to housing 120.

Figure 3:
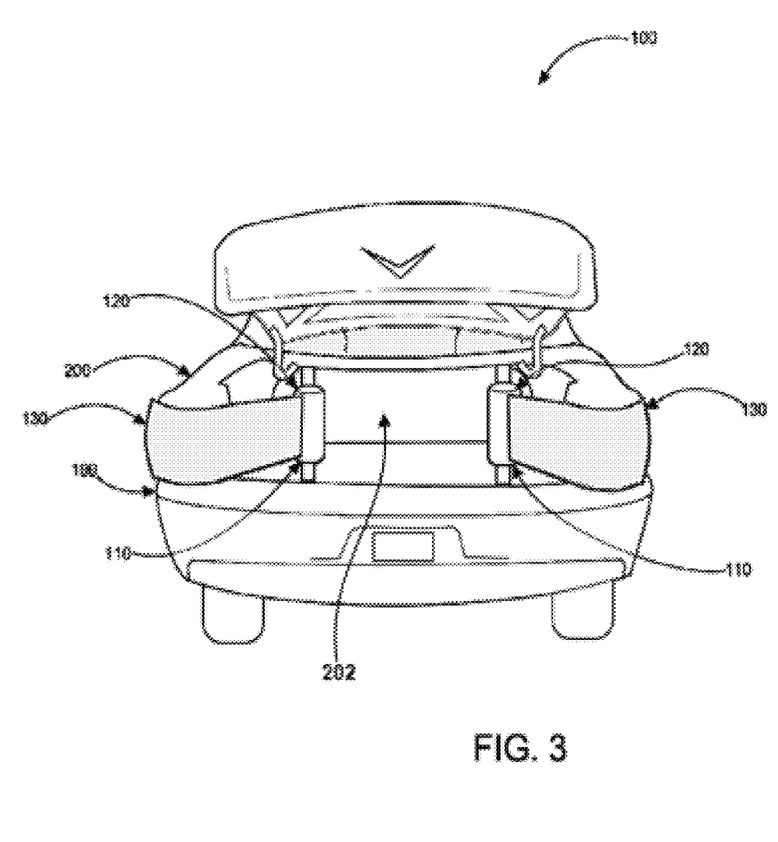
FIG. 3 is a perspective view illustrating the retractable impact protection system for use with a vehicle body installed in a vehicle trunk and in an extended position according to an embodiment of the present invention of FIG. 1.

Referring now to FIG. 3, a perspective view illustrating retractable impact protection system for use with a vehicle body 100 installed in vehicle 200 trunk 202 and in an extended position according to an embodiment of the present invention of FIG. 1

Jack end(s) 190 of securer 180 friction-contact inner volume upper and lower surfaces such as in trunk of vehicle 200, and comprise at least one telescopic brace 210 for removably affixing preferably in a vertical position. Jack end(s) 190 further comprise feet 220 on terminal ends 212 of telescopic brace(s) 210. Telescopic brace(s) 210 may comprise at least one telescopic segment 214 (that can be expanded or contracted as desired) and are concentrically located at each terminal end(s) 212. The plurality of telescopic segments 214 may twist-lock such that telescopic segments 214 are prevented from collapsing when in the extended condition. Hydraulic pressure or threads may also provide means for accomplishing this. Feet 220 may comprise threaded shaft 230 such that feet 220 are able to be rotated counter-clockwise to extend and clockwise to retract securer 180 thereby being able to threadably extend and retract a length of retractable impact protection belt assembly(s) 110 for securing to a suitable fixed point/surface.

Figure 4:
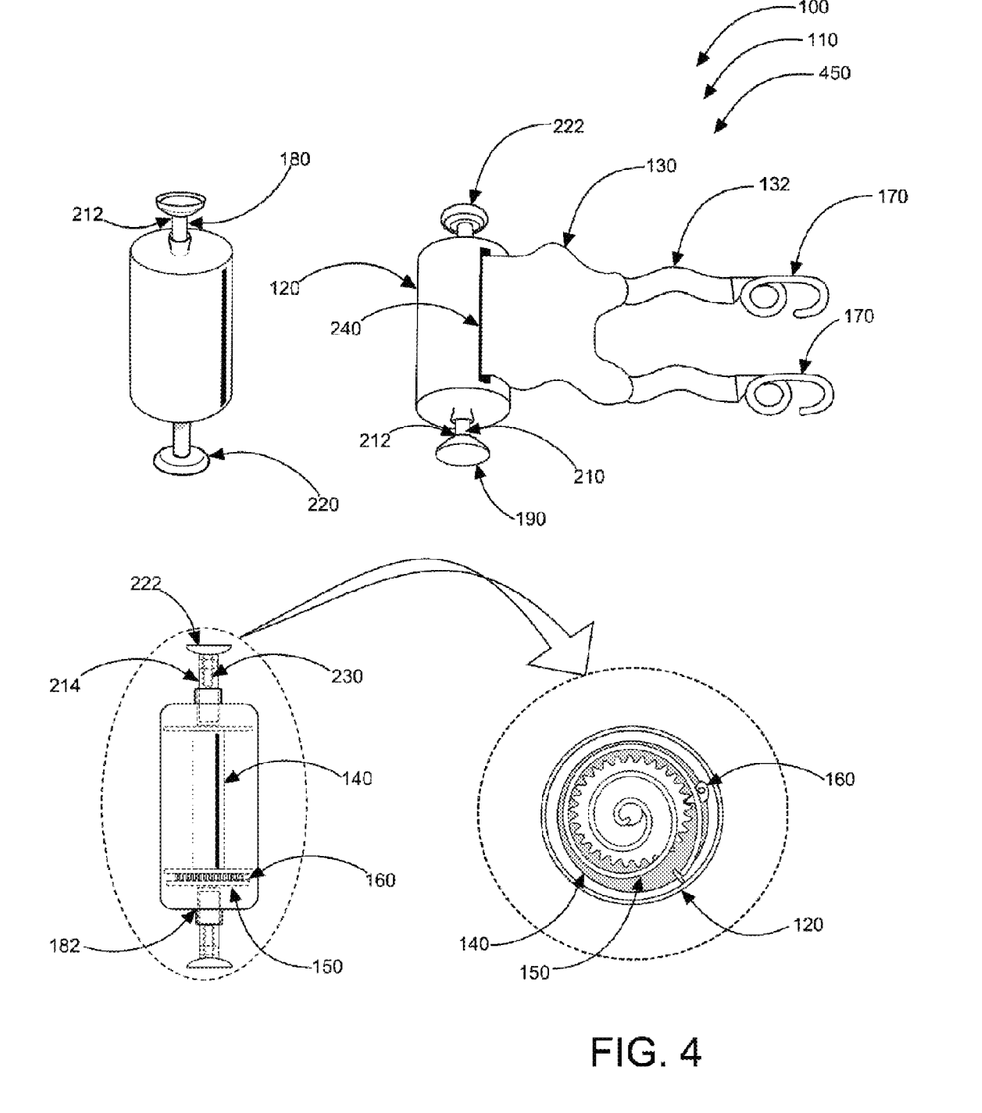
FIG. 4 is a perspective view illustrating the retractable impact protection system for use with a vehicle body according to an embodiment of the present invention of FIG. 1.

Referring now to FIG. 4, a perspective view illustrating retractable impact protection system for use with a vehicle body 100 according to an embodiment of the present invention of FIG. 1.

Protector-band 130 is able to be sequentially wound and unwound to and from spool 140 that is located within the inner volume of housing 120. Spring re-winder 150 and locking pawl 160 control relative movement of protector-band 130 in relation to spool 140. Distal end 134 of protector-band 130 is non-removably attached to spool 140. Spool 140 is able to rotate inside housing 120; housing 120 comprising a substantially cylindrical shape. Housing 120 preferably comprises ferrous metal but may be constructed of plastic or other materials. Housing 120 preferably comprises lengthwise opening 240 such that protector-band 130 is able to be wound onto and unwound off of spool 140 through lengthwise opening 240. Protector-band 130 is able to be stored within housing 120 in a non-extended position during a non-use (stored) condition.

Retractable impact protection system for use with a vehicle body 100 according to an embodiment of the present invention of FIGS. 1-4, may be sold as kit 450 comprising the following parts: at least one retractable impact protection belt assembly(s) 110; at least one padlock 250 with at least one key; and at least one set of user instructions. Retractable impact protection system for use with a vehicle body 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations to match exterior paint of vehicle 199, parts may be sold separately, etc., may be sufficient. Clips or fastening means may be provided for attachment to the vehicle.

Figure 5:
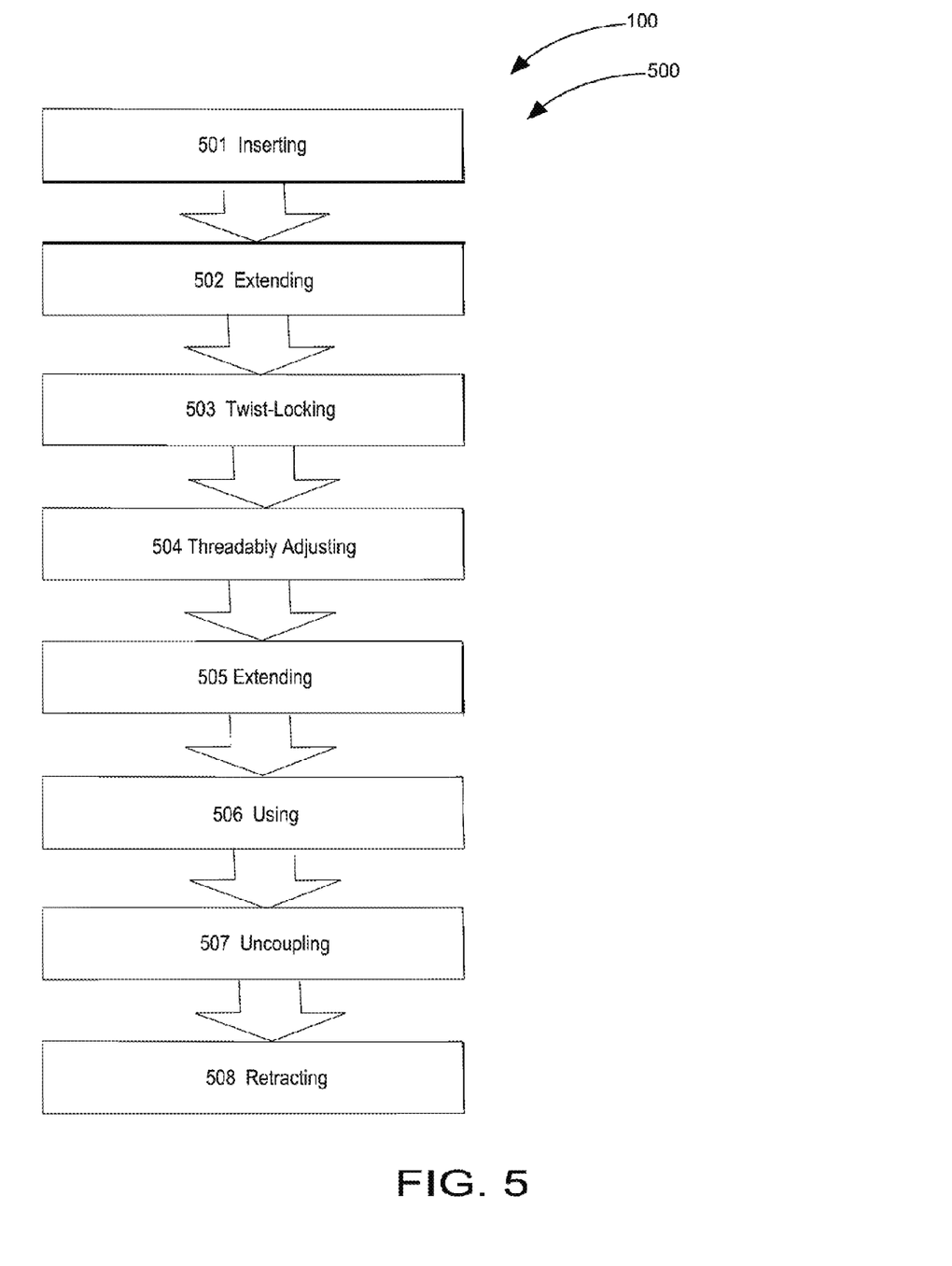
FIG. 5 is a flowchart illustrating a method of use of the retractable impact protection system for use with a vehicle body according to an embodiment of the present invention of FIGS. 1-4.

Referring now to FIG. 5, showing a flowchart illustrating a method of use 500 for retractable impact protection system for use with vehicle body 100 according to an embodiment of the present invention of FIGS. 1-4.

A method of use 500 for retractable impact protection system for use with a vehicle body 100 may comprise the steps of: step one 501 inserting retractable impact protection belt assembly(s) 110 into vehicle 200 trunk inner volume in a substantially vertical position; step two 502 extending at least one securer 180; step three 503 twist-locking at least one securer 180 into a fixed position; step four 504 threadably adjusting at least one foot 222 of at least one securer 180 to wedge retractable impact protection belt assembly(s) 110 between an upper surface and a lower surface of an inner volume of the trunk of vehicle 200 within vehicle body 199; step five 505 extending protector-band 130 of at least one retractable impact protection belt assembly(s) 110 and coupling at least one attacher(s) 170 at a point on a front location of vehicle 200; step six 506 using retractable impact protection belt assembly(s) 110; step seven 507 uncoupling at least one attacher(s) 170; and step eight 508 retracting protector-bands 130.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A retractable impact protection system for use with a vehicle body comprising:
    a) at least one retractable impact protection belt assembly having;
        i) a housing with an inner volume;
        ii) a protector-band having;
            (1) a proximate end; and
            (2) a distal end;
        iii) a spool having a spring re-winder and locking pawl;
        iv) at least one attacher having;
            (1) a first end with a protector-band-receiver; and
            (2) a second end with at least one lockable hook; and
        v) at least one securer having an attachment end and at least one jack end;
    b) wherein said protector-band can sequentially wind and unwind to and from said spool, said spool located within said inner volume of said housing, said spring re-winder and said locking pawl controlling movement of said protector-band in relation to said spool;
    c) wherein said distal end of said protector-band is attached to said spool;
    d) wherein said spool rotates inside said housing;
    e) wherein said proximate end of said protector-band is coupled to said at least one attacher at said first end through said protector-band-receiver;
    f) wherein said protector-band is stored within said housing in a nonextended position during a non-use condition;
    g) wherein said at least one attacher is attachable such that said protector-band is secured in an extended position adjacent to said vehicle body;
    h) wherein said at least one securer secures said retractable impact protection belt assembly to a stationary fixed point adjacent said vehicle body, secures said attachment end to said housing, and said at least one jack end friction-contacting an inner volume surface of said vehicle body;
    i) wherein said at least one lockable hook of said second end hold said protector-band in said extended position; and
    j) wherein said protector-band when in said extended position protects said vehicle body from impact damage by creating a barrier to objects that would otherwise impinge on said vehicle body.

2. The retractable impact protection system for use with a vehicle body of claim 1 wherein said at least one jack end of said at least one securer comprises at least one telescopic brace which is mountable in a trunk of said vehicle body.

3. The retractable impact protection system for use with a vehicle body of claim 1 wherein said retractable impact protection system comprises exactly two of said at least one retractable impact protection belt assembly each having one of said protector-band and one of said at least one attachers such that each of said at least one attacher can be coupled to each other in a front location of said vehicle body.

4. The retractable impact protection system for use with a vehicle body of claim 1 wherein said protector-band is heavy gauge nylon.

5. The retractable impact protection system for use with a vehicle body of claim 4 wherein said protector-band is at least 12 inches wide and about 12 feet long.

6. The retractable impact protection system for use with a vehicle body of claim 4 wherein said protector-band comprises a corrugated cross-section.

7. The retractable impact protection system for use with a vehicle body of claim 4 wherein said protector-band comprises a flat cross-section.

8. The retractable impact protection system for use with a vehicle body of claim 4 wherein said protector-band is flexible, yet can be pulled taut.

9. The retractable impact protection system for use with a vehicle body of claim 1 wherein said housing comprises a substantially cylindrical shape.

10. The retractable impact protection system for use with a vehicle body of claim 1 wherein said housing comprises ferrous metal.

11. The retractable impact protection system for use with a vehicle body of claim 2 wherein said at least one jack end further comprises feet on terminal ends of said at least one telescopic brace.

12. The retractable impact protection system for use with a vehicle body of claim 11 wherein said feet comprise a threaded shaft such that said feet are able to be rotated counterclockwise to extend and clockwise to retract said at least one securer thereby being able to extend and retract a length of said protector-band for securing.

13. The retractable impact protection system for use with a vehicle body of claim 12 wherein said at least one telescopic brace comprises at least one telescopic segment.

14. The retractable impact protection system for use with a vehicle body of claim 13 wherein said at least one telescopic brace is concentrically located at each said terminal ends.

15. The retractable impact protection system for use with a vehicle body of claim 14 wherein said at least one telescopic segment twist-locks such that said at least one telescopic segment is prevented from collapsing when in said extended position.

16. The retractable impact protection system for use with said vehicle body of claim 3 wherein said at least one attachers of said exactly two of said at least one retractable impact protection belt assembly is locked to each other wherein said exactly two of said at least one retractable impact protection belt assembly traverses a majority of a longest outer perimeter of said vehicle body.

17. The retractable impact protection system for use with a vehicle body of claim 1 wherein said housing comprises a lengthwise opening such that said protector-band can be wound onto and unwound off of said spool through said lengthwise opening.

18. A retractable impact protection system for use with a vehicle body comprising:
 a) at least one retractable impact protection belt assembly having;
  i) a housing with an inner volume;
  ii) a protector-band having;
   (1) a proximate end; and
   (2) a distal end;
  iii) a spool having a spring re-winder and locking pawl;
  iv) at least one attacher having;
   (1) a first end with a protector-band-receiver; and
   (2) a second end with at least one lockable hook; and
  v) at least one securer having attachment end and at least one jack end;
 b) wherein said protector-band can be sequentially wound and unwound to and from said spool, said spool located within said inner volume of said housing, said spring re-winder and said locking pawl control relative movement of said protector-band in relation to said spool;
 c) wherein said distal end of said protector-band is non-removably attached to said spool;
 d) wherein retractable impact protection system comprises said exactly two of said at least one retractable impact protection belt assembly each having one of said protector-bands and one of said at least one attachers such that each of said at least one attacher can be coupled to each other in a front location of said vehicle body;
 e) wherein said protector-band is heavy gauge nylon;
 f) wherein said protector-band is at least 12 inches wide and about 12 feet long;
 g) wherein said protector-band comprises a flat cross-section;
 h) wherein said protector-band is flexible, yet can be pulled taut;
 i) wherein said spool can rotate inside said housing;
 j) wherein said housing comprises a substantially cylindrical shape;
 k) wherein said housing comprises ferrous metal;
 l) wherein said housing comprises a lengthwise opening such that said protector-band can be wound onto and unwound off of said spool through said lengthwise opening;
 m) wherein said proximate end of said protector-band is coupled to said at least one attacher at said first end through said protector-band-receiver;
 n) wherein said protector-band can be stored within said housing in a nonextended position during a non-use condition;
 o) wherein said at least one attacher is attachable such that said protector-band can be secured in said extended position about a longest outer perimeter of said vehicle body;
 p) wherein said at least one securer secures said retractable impact protection belt assembly to a stationary fixed point adjacent said vehicle body, secures said attachment end to said housing, and said at least one jack end friction-contacting an inner volume surface of said vehicle body;
 q) wherein said at least one jack end of said at least one securer comprises at least one telescopic brace which is mountable in a trunk of said vehicle body;
 r) wherein said at least one jack end further comprises feet on terminal ends of said at least one telescopic brace;
 s) wherein said at least one telescopic brace comprises at least one telescopic segment;
 t) wherein said at least one telescopic brace is concentrically located at each said terminal end;
 u) wherein said at least one telescopic segment twist-locks such that said at least one telescopic segment is prevented from collapsing when in said extended position;
 v) wherein said feet comprise a threaded shaft such that said feet are able to be rotated counter-clockwise to extend and clockwise to retract said at least one securer thereby being able to threadably extend and retract a length of said protector-band for securing;
 w) wherein said at least one lockable hook of said second end holds said protector-band in said extended position; and
 x) wherein said protector-band when in said extended position can protect said vehicle body from impact damage by creating a barrier; and
 y) wherein said at least one attachers of said exactly two retractable said at least one impact protection belt assemblies are lockable to each other wherein exactly two of said at least one retractable impact protection belt assembly covers a majority of said longest outer perimeter of said vehicle body.

19. The retractable impact protection system for use with a vehicle body of claim 18 further comprising a kit having:
 a) said at least one said retractable impact protection belt assembly;
 b) at least one padlock with at least one key; and
 c) a set of user instructions.

20. A method of use of said retractable impact protection system of claim 1 with a vehicle body comprising the steps of:
 a) inserting at least one retractable impact protection belt assembly into an inner volume of a trunk of said vehicle body in a substantially vertical orientation;
 b) extending at least one securer;
 c) twist-locking said at least one securer into a fixed position;
 d) threadably adjusting at least one jack end of said at least one securer to wedge said retractable impact protection belt assembly between an upper surface and a lower surface of an inner volume of said trunk of said vehicle body;
 e) extending said protector-band of said at least one retractable impact protection belt assembly and coupling at said least one attacher to said vehicle;
 g) uncoupling at said least one attacher; and
 h) removing said protector-band from said vehicle.

* * * * *